Oct. 18, 1960     B. J. KERLEY, JR     2,956,713
LIQUID METERING METHOD AND APPARATUS
Filed Feb. 28, 1957     3 Sheets-Sheet 2

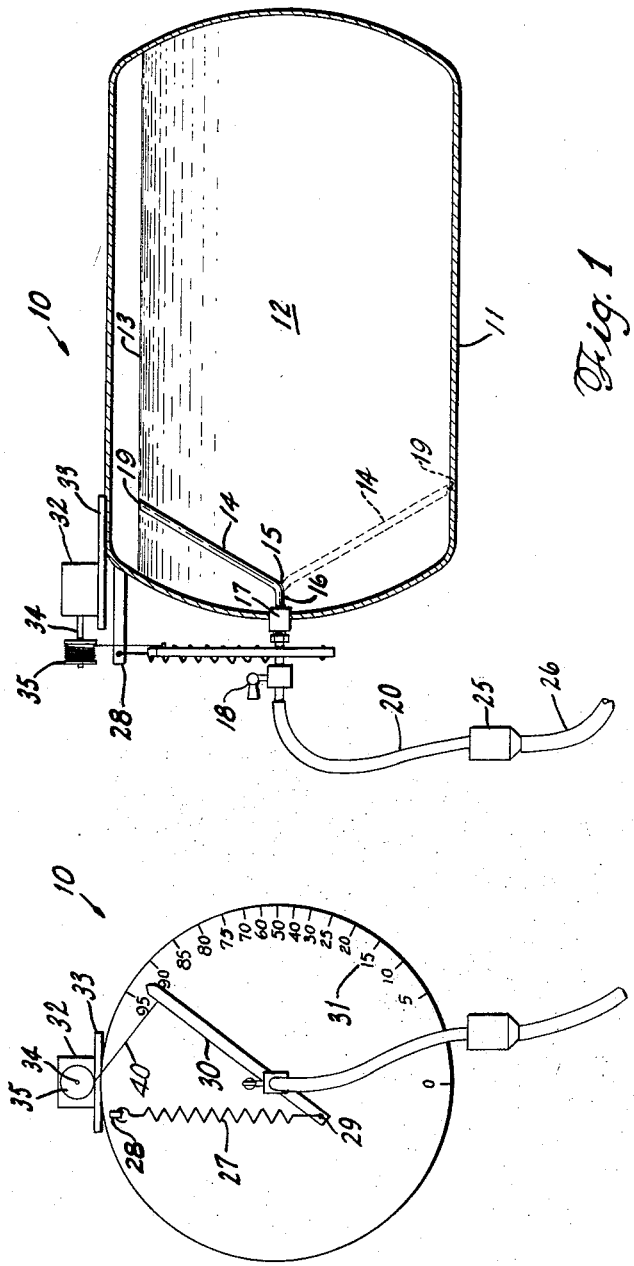

INVENTOR.
BERNARD J. KERLEY, JR.
BY
ATTORNEY

INVENTOR.
BERNARD J. KERLEY, JR.
BY Edward P. Zigg
ATTORNEY

United States Patent Office 2,956,713
Patented Oct. 18, 1960

2,956,713

LIQUID METERING METHOD AND APPARATUS

Bernard J. Kerley, Jr., P.O. Box 177, Imperial, Calif.

Filed Feb. 28, 1957, Ser. No. 643,036

5 Claims. (Cl. 222—464)

This invention relates to method and apparatus for metering liquids. More particularly, it relates to a method and to apparatus for agricultural use to dispense and meter fertilizing liquids, such as aqueous ammonia solutions, liquefied anhydrous ammonia, and aqueous solutions of solid fertilizers such as nitrates and phosphates.

It has become common practice in certain agricultural areas, e.g., the Imperial Valley and other irrigated agricultural regions of the United States, to fertilize soil by means of liquid fertilizer. The fertilizer may be injected or otherwise applied directly to the soil or it may be mixed with irrigation water. Aqueous ammonia solutions containing ammonium nitrate, and anhydrous ammonia are dispensed in this manner in large quantities.

In either instance, i.e., direct application to the soil or mixing with irrigation water, it is desirable to apply the fertilizer uniformly and in calculated amounts per acre. This requires a measured delivery—a metering—of the liquid fertilizer.

Such metering has been difficult to accomplish. The rate of flow is generally relatively small, in some cases as low as one gallon per hour, but most generally between 5 and 20 gallons per hour. It is more economical and efficient to employ a small volume of concentrated or relatively concentrated fertilizer than to employ a large volume of dilute fertilizer. Small orifices have been employed heretofore to restrict and thereby control the rate of flow. Small orifices, however are easily plugged by foreign matter, such as oil, flakes of rust from containers, solid impurities in the liquid fertilizer, etc.

Such difficulties can be obviated by employing large outlet orifices. However, this expedient has not been deemed feasible because it causes too great a rate of flow. This has been particularly so in the case of liquids under pressure, such as anhydrous ammonia.

It is an object of the present invention to provide improved liquid metering and dispensing methods and apparatus.

It is a further object of the invention to provide a method and apparatus for dispensing and distributing liquid fertilizers, including those under pressure and those not under pressure, which employ a large outlet orifice, yet permit controlled, accurate metering.

Yet another object is to provide a liquid metering and dispensing method and apparatus suited for distribution of liquid fertilizers at a controlled rate, which employ a relatively large outlet passage and which are adapted to dispense pressurized and nonpressurized liquids at a controlled rate without restricting the liquid flow by a small metering orifice.

These and other objects of the invention will be apparent from the ensuing description and the appended claims.

Certain forms of the invention are illustrated by way of example in the accompanying drawings, in which:

Figure 1 is a view, partly in side elevation and partly in section, of one form of metering and dispensing apparatus in accordance with the invention, such apparatus being intended for use primarily with pressurized liquids such as liquid anhydrous ammonia.

Figure 2 is a view in end elevation of the same apparatus as seen from the left of Figure 1.

Figure 3:
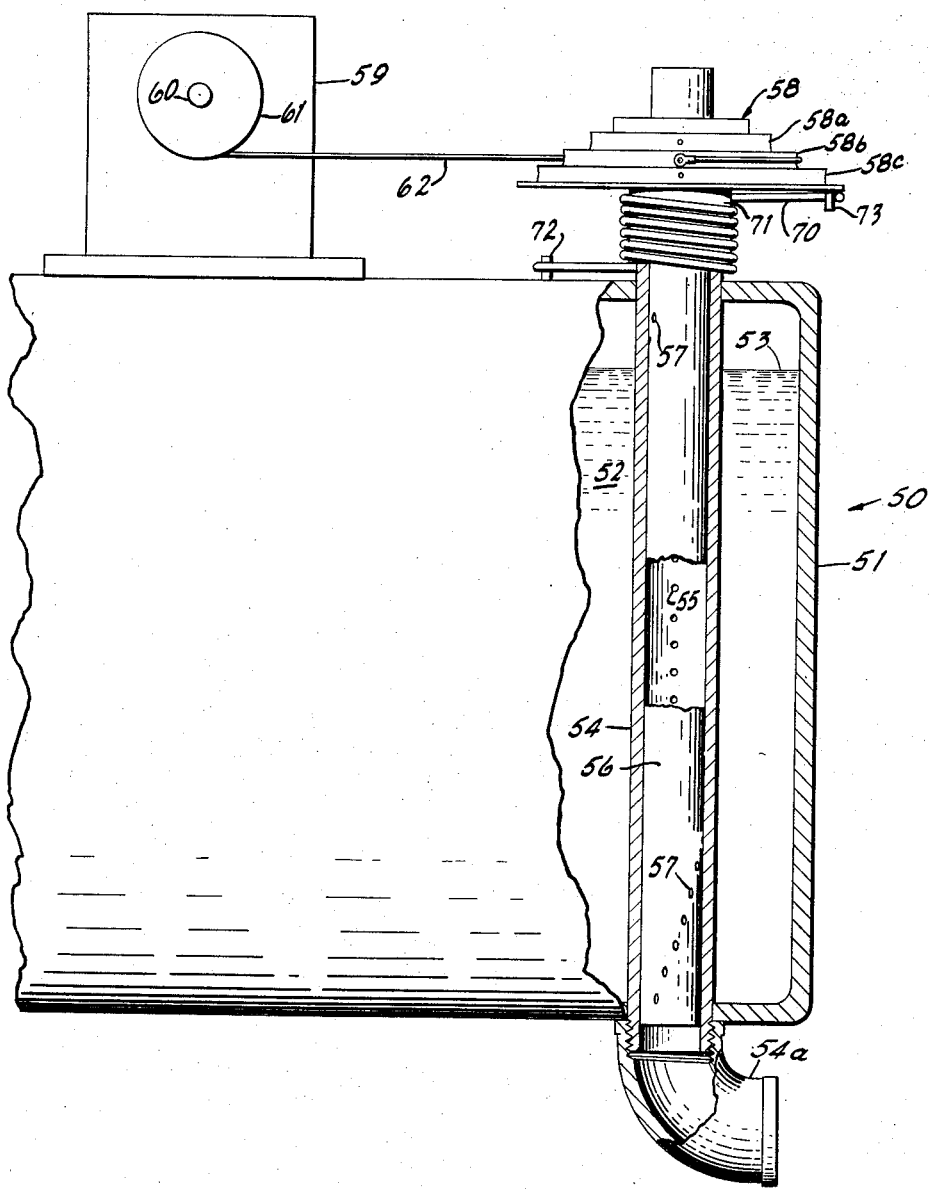
Figure 3 is a view partly in side elevation and partly in vertical section, of another form of metering and dispensing apparatus in accordance with the invention, which is adapted for use with both pressurized liquids such as liquid anhydrous ammonia and nonpressurized liquids such as aqueous solutions.

In accordance with the present invention, I provide metering apparatus of a type which may be called "free flow," in which an outlet duct is provided having an inlet end and an outlet end intended to be disposed within and without the vessel, respectively, in which a liquid is held. The inlet end of the tube is movable with a vertical component of motion. The tube, including its inlet and outlet ends, is characterized as a "free passageway," by which I mean that it is not restricted in free cross sectional area to throttle the outflow of liquid. Such terms as "free passageway" and "free cross sectional area," which will be better understood in the light of the following description and the accompanying drawings, are relative terms in this sense, that within the desired limits of operation they do not offer any appreciable resistance to passage of liquid at the pressure prevailing at the liquid surface.

My apparatus further includes automatic means including a timing element which imparts to the movable inlet end of the outlet duct a downward movement at the desired rate, such timing element being preferably adjustable so that the rate of metering can be varied as well as controlled.

Inasmuch as the outlet duct provides a "free passageway," and its inlet end is lowered at a controlled rate, it will be apparent that the apparatus will meter a liquid without the use of a conventional, restricted metering orifice.

Referring now to the drawings, and more particularly to Figures 1 and 2, the apparatus there shown is generally designated by the reference numeral 10. This apparatus and the method of employing it are a form of the invention specially adapted to dispense liquids which are under a positive pressure which is sufficient to lift the liquid at least to the center line of the tank. The apparatus comprises a tank 11 which is intended to contain a supply of liquid fertilizer whose surface or level is shown at 13. An outlet tube 14 is provided which is formed with an elbow at 15 and which has a horizontal section 16 which extends rotatably through a sealing member 17. A hand valve 18 is provided by means of which the outlet end of the tube 14 can be opened or closed at will. The inlet end 19 of the tube 14 is open and it is of relatively large size, sufficient to practically eliminate clogging by solids and foreign matter in the liquid fertilizer 12.

It is an important advantage of the method and apparatus of the invention that the size of the inlet opening, i.e., the inlet to the tube 19, may vary within wide limits; i.e., it is not a critical limiting factor as in prior methods and apparatus wherein a restricted opening is required. In the present invention a single opening size, e.g., a ¼ square inch opening, will suffice for a wide range of flow rates. It may, however, be desirable to employ a larger opening size for larger flow rates or a smaller opening size for small flow rates, particularly where the liquid being dispensed is held under relatively high pressure. The essential consideration to opening size is that the outlet duct which includes the entire passageway from the inlet end 19 to the discharge end should not restrict the desired flow of liquid from the vessel. To insure that the desired flow of liquid is not restricted it is recommended that the passageway be of sufficient size to flow all the desired liquid and in addition an appreciable amount of vapor, at the lowest pressure that might exist from the start to finish. In the case of liquids with high vapor pressure a limit to the size of the outlet may be desired to prevent excessive flow of vapor and to reduce surging. Excessive flow of vapor will occur only when the desired amount is being entirely vaporized and as such is passing from the tank with no liquid flow at all. This would take place only in the case of an extremely oversize opening, because vapor in all instances is many times more voluminous than the same weight as a liquid at the same pressure.

Stated somewhat differently, the outlet tube 14 including both ends should define a free passageway which, when the inlet end 19 is just submerged in the liquid in tank 10, will drain liquid freely at the pressure prevailing at the liquid surface. In the case of a pressurized liquid such as liquid anhydrous ammonia, this pressure will be substantial, but in the case of nonpressurized liquid, the pressure will be very small.

A flexible tube or hose 20 is provided which is connected at one end to the valve 18 and at its other end to a surge chamber 25, to which one end of a flexible tube or hose 26 is connected. The other end of the hose 26 will be inserted into irrigation water; or in the case of injection into soil, it will be attached to the injector or injector distributor, or to any other outlet or distributing device desired.

A spring 27 is provided which is connected at one end to a bracket 28 fixed to the tank 11 and at its other end at 29 to a combined lever and pointer 30. The latter is fixed to the outer end of the tube 14 so that the lever and the tube 14 rotate together. It is intended that the tube 14 rotate from the up position shown in solid lines in Figure 1 to the down position shown in broken lines during dispensing of liquid fertilizer. The lever 30 serves also as a pointer or indicator in conjunction with a scale 31. A timing device is provided at 32 which is supported on a bracket 33 fixed to the tank 11 and which has a shaft 34 to which a winch 35 is fixed. A cable 40 is connected at one end to the winch 35 and at its other end to the lever 30. The timing device 32 may be of any suitable type, several of which are known and require no detailed description herein.

In operation the timing device 32 is set to rotate the lever 30, and with it the tube 14, through an angle of approximately 180° in the time desired, in order to dispense liquid at a uniform rate and to maintain the inlet end or orifice 19 partly submerged at all times. The lever 30 is rotated to the up position shown in solid lines in Figures 1 and 2, the hand valve 18 is opened, and the lever 30 is rotated by hand until liquid just commences to flow. The timing mechanism is then started. It pays out the cable 40 at the desired rate. Liquid is, therefore, dispensed at the desired volume per minute or other unit of time.

The use of the spring 27 to actuate the lever 30 with the cable 40 paying out as described above is just one of many ways of causing the opening to move downward at a desired rate. The timing device may be made to actuate the lever 30 through a system of gears (not shown) if it is so desired. Or a simple cam (not shown) may be designed to transfer the motion of the timing device to the movement of the lever.

Due to the large cross sectional area of the open inlet end 19 of the tube 14 and of the bore of the tube, clogging of the opening and tube will not occur. Nevertheless, a uniform rate of delivery of liquid is maintained because the outlet end 19 is always submerged just enough for liquid to flow into the tube 14. Variations of rate of flow with change in liquid head and change in vapor pressure will be quite small. Also, variations in rate of flow with change of temperature will be small.

The timing device 32 may also be of a type and so adjusted as to rotate the tube 14 at a nonuniform rate. For example, to obtain a uniform rate of flow from a horizontal cylindrical tank, which is the most popular arrangement for liquid fertilizers, will require that the opening be moved downward at a nonuniform rate, with the rate of movement at the centerline position being less than at any position below or above this position. The most popular container for pressure liquids such as anhydrous ammonia is a horizontal cylindrical tank with hemispherical or semi-elliptical heads and these will require another change to correct for the shape of the heads. Mathematically speaking, the vertical component of the downward movement of the inlet opening 19 of the tube 14 must be inversely proportional to the area of the liquid surface in the tank at any particular instant from start to finish to maintain a uniform rate. This nonuniform rate may be obtained with a properly designed cam and gear arrangement (not shown). Or, referring to Figures 1 and 2, the winch 35 may have a varying radius to pay out the cable at a nonuniform rate.

Referring now to Figure 3, another form of apparatus is there shown which is generally designated by the numeral 50. A tank 51 is provided which is intended to contain liquid fertilizer 52, the level or surface of which is shown at 53. An outer vertical pipe 54 is provided which is formed with holes 55 extending substantially from top to bottom. Disposed within the outer pipe 54 is an inner pipe 56. The latter forms a close but rotating fit within the outer pipe 54; i.e., the two pipes are disposed like two sleeves, one within the other, the inner pipe or sleeve being rotatable and in sealing arrangement with the inner surface of the outer pipe or sleeve. The inner pipe 56 is also formed with holes 57 which, however, are arranged in the form of a spiral. The spiral may make a complete, 360° turn from top to bottom. Preferably it makes a turn which is about 10–15° less than a complete turn so that a short cut-off will exist. However, the holes 57 may be arranged in a spiral having two or more turns provided the inner tube 56 is moved vertically to prevent two or more holes 57 at different levels from coinciding with the holes 55.

The inner pipe 56 projects above the tank 51 and to its upper end is fixed a set of driving pulleys 58. A timing device 59 is provided having a shaft 60 and a winch 61 which pays out a cable 62 which is fixed to one or the other of three pulleys 58a, 58b, 58c. The latter provide a variable drive for the inner pipe 56. A torsion spring 70 is provided which is wound about the hub 71 of the pulleys, one end of the spring bearing against a pin 72 fixed to the tank 51 and the other bearing against pin 73 fixed to the pulley 58c.

The holes 55 and 57 in the outer pipe 54 and inner pipe 56 are so arranged that, as the inner pipe 56 is rotated from its starting position, the spirally arranged holes 57 in the inner pipe 56 will register in succession with the vertical line of holes 55 in the outer pipe 54, commencing at the top and proceeding thence to the bottom of the tank. Liquid can flow from the tank 51 into the inner tube 56 only when a pair of the holes 55 and 57 are in registry. It will, therefore, be apparent that as the inner pipe 56 rotates the liquid level 53 will fall and liquid will flow through the outlet 54a at a rate determined by the rate of rotation of the inner pipe 56.

Some unevenness of flow will result from the spacing of the holes 55 and 57. However, this is not objectionable in many applications. Moreover, the flow can be evened out by means of a surge chamber. Also, the holes 55 and 57 can be placed closer together. Alternatively, the outer pipe 54 may be slit to provide a continuous opening from top to bottom instead of spaced holes. Alternatively, a large number of small, vertical slits may be formed in the pipe 54 which are closely spaced together, thus approximating a continuous slit.

When a nonpressurized liquid is dispensed, it will be taken out of the lower end of pipe 54 to a suitable nozzle or distributing device (not shown). Where a pressurized liquid is dispensed, e.g., anhydrous ammonia, it may be preferred to plug the lower end of the pipe 54 and to take the liquid out of the upper end of pipe 56.

In the embodiments described above and illustrated in Figures 1, 2 and 3, the partially submerged metering orifice is disposed within the vessel which contains the liquid being dispensed.

Figure 4:
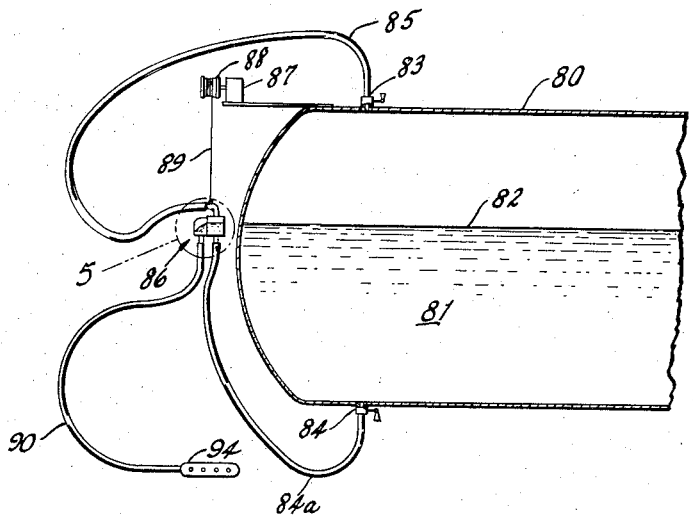
Figure 4 is a view partly in section and partly in side elevation of a modified form of dispensing apparatus in accordance with the invention.
Figure 5:
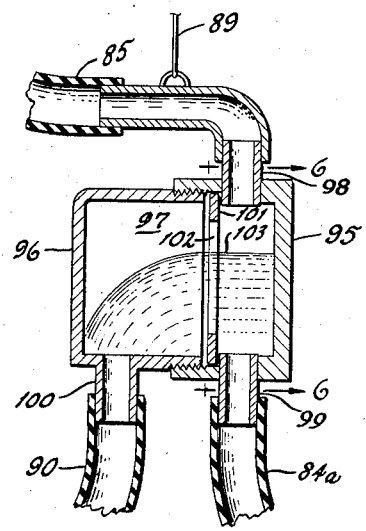
Figure 5 is a view in vertical midsection of the metering portion of the apparatus of Figure 4, but on a larger scale.
Figure 6:
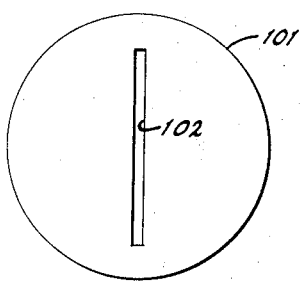
Figure 6 is a view in side elevation of the metering orifice plate or weir of Figure 5.

Referring now to Figures 4, 5 and 6 of the drawings another form of apparatus is there shown in which the metering orifice is disposed outside of the vessel containing the liquid to be dispensed.

In Figure 4 a cylindrical tank is shown at 80 containing liquid 81, the surface of which is shown at 82. A vapor valve 83 is provided at the top of the tank. The tank 80 is also provided with a liquid outlet valve 84 disposed at the bottom of the tank. The vapor valve 83 is connected by a flexible tube 85 to a metering device which is generally designated by the reference numeral 86 and which is described hereafter in detail with reference to Figures 5 and 6. The liquid outlet valve 84 is connected by a flexible conduit 84a to the metering device 86. A timing device is provided at 87 which rotates a pulley 88 which is connected by a cord or cable 89 to the metering device 86. The metering device 86 is connected by a flexible tube 90 to an outlet element 94 for supplying the metered liquid and vapor to a body of water or wherever else it is desired to dispense the liquid.

Referring now to Figures 5 and 6, the metering device 86 is shown as being supported by the cable 89. It is intended that, in operation, the device 86 be lowered at a controlled rate by the timing device 87. The metering device 86 comprises a housing which is formed in two parts, 95 and 96, which are threaded together to form a chamber 97. The chamber 97 is provided with two inlets in the form of tubes 98 and 99 which connect to the vapor inlet tube 85 and the liquid inlet tube 84a, respectively. The chamber 97 is also provided with an outlet tube 100 which connects to the flexible conduit 90.

Disposed within the chamber 97 is a metering plate or weir element 101 having a vertical slot 102 formed therein. The plate 101 is disposed in vertical position within the chamber 97 with the slot 102 in vertical position and it is so located that the inlets 98 and 99 are on one side of the plate and the outlet 100 is on the other side of the plate.

At the start of operation the metering device 86 is adjusted so that the slot 102 lies partly above and partly below the liquid level 82 in the tank 80. It will be apparent that, in this position, liquid will flow from the liquid outlet valve 84 through the conduit 84a into the chamber 97, that vapor will flow through the vapor outlet valve 83 and the conduit 85 into the chamber 97 and that a liquid level will exist at 103 within the chamber 97. The timing device 87 will then be caused to operate to lower the metering device 86 at the desired rate. It will be apparent that the liquid level will be maintained within the chamber 97 and that the metering slot 102 will remain partly submerged and will allow outflow of both vapor and liquid.

Among the advantages of the exterior metering device illustrated in Figures 4, 5 and 6, there may be mentioned the following: All of the moving parts are located outside the tank, hence are more readily accessible and more easily repaired and maintained. Also, this type of metering device is more easily installed on tanks presently in use, because only liquid and vapor outlets need be provided, such being the only modification of the tank itself. All else is external to the tank.

I have found that, in general, a submergence of the outlet metering orifice (whether of the type shown in Figure 1, Figure 3 or Figure 5), is preferably not less than about 10% nor more than about 80%. With submergence less than 10% the opening size should be greater and with submergence more than 80% it should be smaller. Best results are obtained within the 10% to 80% range indicated.

In all the embodiments of the invention herein described, a constant time rate of flow is provided. The flow may, however, be caused to vary with the distance traversed by a vehicle, such as a tractor employed to transport the tank 11 or 51 over a field. In such a case, the timing device 32 in Figures 1 and 2, or the device 59 in Figure 3, may be replaced by a gear reduction unit which is driven by the wheels of a tractor. The gear reduction unit will pay out the cable 40, 62 or 89, as the case may be, at a rate which is proportional to the distance traveled.

Another advantage of the process and apparatus of the present invention remains to be pointed out, as follows: When the liquid dispensed has a high vapor pressure, e.g., liquid anhydrous ammonia, it evaporates rapidly, hence chills and acquires, by reason of temperature reduction, a relatively low pressure. By reason of this fact a dispensing tank such as shown at 11 in Figure 1, at 51 in Figure 3 or at 80 in Figure 4, can be connected to a large storage or "nurse" tank (not shown) which is maintained at a higher temperature, e.g., at ambient temperature. The liquid in the storage or nurse tank will, therefore, have a higher vapor pressure and will supply liquid automatically to the dispensing tank by reason of the pressure differential. A valve (not shown) may be employed to control the supply of liquid to the dispensing tank.

It will be apparent, therefore, that liquid dispensing method and apparatus have been provided which are capable of dispensing liquid fertilizer, such as aqueous ammonia, anhydrous ammonia, aqueous solutions of solid fertilizer such as phosphates and nitrates, and the like. Such method and apparatus dispense the liquid fertilizer at any desired controlled rate, e.g. at a uniform time rate, at a controlled variable time rate, or at a rate proportional to the ground traversed by the apparatus. Such apparatus and method avoid the shortcomings mentioned above of prior equipment wherein an outlet orifice of very small dimensions is employed.

I claim:

1. Apparatus for dispensing a liquid from a starting level at a predetermined rate, comprising a vessel for containing the liquid, dispensing means for conveying the liquid from the interior of the vessel and discharging same and including an inlet portion in communication with said vessel and having an inlet passage of substantially non-clogging dimensions for freely passing the liquid in greater volume than the desired predetermined rate, said inlet portion being movable relative to said vessel with an effectively vertical component of motion, and metering means connected with said inlet portion and continuously operative during the liquid dispensing period to move said inlet portion to effectively lower said inlet portion at a controlled rate whereby said inlet portion is effectively and continuously moved relative to the liquid level in said vessel to dispense the liquid at the desired predetermined rate.

2. The apparatus of claim 1 in which the metering means is power driven.

3. Apparatus for dispensing a liquid at a predetermined rate, comprising a vessel for containing the liquid, dispensing means for conveying the liquid from the interior of the vessel and discharging same, said dispensing means including a discharge tube having an inlet portion within the vessel and an outlet portion extending through a wall of the vessel and in rotating sealing engagement with said wall, said tube being rotatable to impart to said inlet portion an effectively vertical component of motion, said inlet portion being of substantially non-clogging dimensions for freely passing the liquid in greater volume than the desired predetermined rate, and metering means connected with said inlet portion and operative to move said inlet portion to effectively lower said inlet portion at a controlled rate whereby said inlet portion is effectively moved relative to the liquid level in said vessel to dispense the liquid at the desired predetermined rate.

4. Apparatus for dispensing a liquid at a predetermined rate, comprising a vessel for containing the liquid, dispensing means for conveying the liquid from the interior of the vessel and discharging same, said dispensing means including a pair of concentric inlet and outlet tubes vertically disposed within said vessel, one of said tubes being rotatable relative to the other, said tubes having respective sets of openings in their walls of substantially non-clogging dimensions for freely passing the liquid in greater volume than the desired predetermined rate, said sets of openings being adapted to register in a downwardly progressing sequence, and metering means connected with one of said tubes and operative to rotate such tube at a controlled rate thereby moving the openings of said tube relative to the liquid level in the vessel to effectively dispense the liquid at the desired predetermined rate.

5. Apparatus for dispensing a liquid at a predetermined rate, comprising a vessel for containing the liquid, said vessel having a vapor outlet at the top and a liquid outlet at the bottom, dispensing means for conveying the liquid from the interior of the vessel and discharging same including a chamber external to said vessel and divided into two portions by a weir, one portion having a vapor inlet and a liquid inlet communicating respectively with said vessel vapor and liquid outlets, the other portion of said chamber having a liquid outlet, said weir and liquid inlet and outlet openings and communicating passages being of substantially non-clogging dimensions for freely passing the liquid in greater volume than the desired predetermined rate, and metering means connected to said chamber for lowering said chamber relative to the liquid level in the vessel at a controlled rate to dispense liquid from the vessel at the desired predetermined rate.

References Cited in the file of this patent

UNITED STATES PATENTS

| | | |
|---|---|---|
| 1,181,783 | Lyons | May 2, 1916 |
| 1,272,688 | Lyons | July 16, 1918 |
| 2,492,944 | Aycock | Jan. 3, 1950 |